United States Patent
Thomson et al.

(10) Patent No.: US 6,636,598 B1
(45) Date of Patent: Oct. 21, 2003

(54) AUTOMATED TRANSACTION DISTRIBUTION SYSTEM AND METHOD IMPLEMENTING TRANSACTION DISTRIBUTION TO UNAVAILABLE AGENTS

(75) Inventors: Rodney A. Thomson, Westminster, CO (US); Thomas S. Fisher, Westminster, CO (US); Joylee Kohler, Northglenn, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/490,789

(22) Filed: Jan. 24, 2000

(51) Int. Cl.[7] ............................. H04M 3/00; H04M 5/00
(52) U.S. Cl. .............................. 379/265.05; 379/266.08
(58) Field of Search .................. 379/265.02, 265.03, 379/265.04, 265.05, 265.06, 265.12, 266.02, 266.08, 309

(56) References Cited

U.S. PATENT DOCUMENTS

| | | | |
|---|---|---|---|
| 4,829,563 A | * 5/1989 | Crockett et al. | ............ 379/309 |
| 5,214,688 A | * 5/1993 | Szlam et al. | ........... 379/266.08 |
| 5,506,898 A | 4/1996 | Costantini et al. | .......... 379/266 |
| 5,642,411 A | * 6/1997 | Theis | ..................... 379/266.08 |
| 6,130,942 A | * 10/2000 | Stenlund | ................. 379/265.12 |
| 6,173,053 B1 | * 1/2001 | Bogart et al. | .......... 379/266.01 |
| 6,333,980 B1 | * 12/2001 | Hollatz et al. | ......... 379/265.12 |
| 6,424,709 B1 | * 7/2002 | Doyle et al. | ........... 379/265.02 |

* cited by examiner

Primary Examiner—Benny Tieu
(74) Attorney, Agent, or Firm—David Volejnicek

(57) ABSTRACT

An automated transaction distribution system assigns an incoming transaction (call, text chat, email, fax, etc.) to an agent who is selected to handle the transaction. If the best agent to select is not available because he or she is handling another transaction, taking a break, in a meeting, or otherwise unavailable, the incoming transaction may still be assigned if the selected agent is expected to become available within an acceptable time period for that type of transaction.

33 Claims, 4 Drawing Sheets

TRANSACTION QUEUE B

AGENT GROUP B

| | SKILL 1 | ... | SKILL N | AVAILABLE |
|---|---|---|---|---|
| AGENT 1 | 10 | | 10 | −5 |
| AGENT 2 | 10 | | 0 | 0 |
| . . . | | | | |
| AGENT N | 0 | | 0 | 5 |

TRANSACTION QUEUE A

AGENT GROUP A

| | SKILL 1 | ... | SKILL N | AVAILABLE |
|---|---|---|---|---|
| AGENT 1 | 10 | | 5 | 0 |
| AGENT 2 | 10 | | 10 | 5 |
| . . . | | | | |
| AGENT N | 0 | | 0 | 10 |

AUTOMATED TRANSACTION DISTRIBUTION SYSTEM AND METHOD IMPLEMENTING TRANSACTION DISTRIBUTION TO UNAVAILABLE AGENTS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to automated transaction distribution systems wherein transactions (call, text chat, email, fax, etc.) are screened and assigned to qualified agents on behalf of transaction initiators.

2. Description of the Prior Art

Automated transaction distribution systems use automated procedures to distribute transactions to available agents employed to handle the transactions. According to these automated procedures, an attempt is made to match a transaction to the best-qualified agent having the skills required to handle the particular requirements of the transaction. For example, Spanish language transactions are preferably distributed to a Spanish speaking agent with the highest Spanish language proficiency level, and so on. In some cases, a transaction may be distributed to an agent that is not the best qualified because better qualified agents are occupied handling other transactions, are on break, are not logged in, or are otherwise unavailable. Subsequently, the original agent may place the transaction participant on hold to await a better-qualified agent. For example, a transaction relating to a particular product may be initially directed to an available agent even though the agent lacks detailed knowledge of the product. If the original agent does not have the knowledge required to complete the transaction, the transaction must be redirected to another agent. In some cases, a transaction may be redirected multiple times during its lifetime until a suitable agent is found.

Transaction redirection is frustrating to transaction participants who want to conclude transactions expeditiously and do not want to repeat the same information to multiple agents. Accordingly, there is a need in an automated transaction distribution system for an agent assignment system and method that allows transactions to be matched to the most suitable agent, and preferably on the first matching attempt.

SUMMARY OF THE INVENTION

The foregoing problems are solved and an advance in the art is obtained by a novel automated transaction distribution system and method that attempts to match a transaction (call, text chat, email, fax, etc.) to an agent who is identified as a preferred agent for possible handling of the transaction. If the identified agent is not available, the transaction may still be assigned if the identified agent is expected to become available within an acceptable time period for that type of transaction. Agent unavailability may be due to any of a variety of reasons. For example, the agent may be occupied handling another transaction, engaged in post-transaction wrap-up activity, on a break, not logged in, in a meeting, in training, performing other tasks and not working transaction contacts, and so on.

In preferred embodiments of the invention, a group of agents having particular transaction skills is assigned to handle one or more queues, on either a primary or secondary basis, as is known in the art. In response to a transaction requiring handling by an agent, identification is made of an agent having sufficient transaction skill proficiency to handle the transaction commensurate with a desired skill proficiency level. A test is also made to determine whether the identified agent is either available, or unavailable but expected to become available within an acceptable time period to handle this type of transaction. If so, the transaction is assigned to the identified agent. If the identified agent is not likely to become available within the required time period, a next agent can be identified and tested for availability.

The testing step may include testing for an availability attribute associated with each agent. In addition, the identifying and testing steps will typically include evaluating one or more skill proficiency attributes for each agent, depending on the skills required by the transaction. In one exemplary embodiment, the skill proficiency and availability attributes for each agent are arranged in a stored agent matrix. The skill proficiency and availability attributes for each agent are compared and selection is made of the agent having the most favorable skill proficiency and availability attributes, or a most favorable composite attribute score. Using weighting, the availability attributes can be emphasized or de-emphasized relative to the skill proficiency attributes to reflect the relative importance of ensuring expeditious transaction processing versus agent skill proficiency matching. By way of example, the availability attributes could be weighted one way for real-time transactions (such as voice, video, chat or multimedia transactions) so that a relatively small amount of agent wait time is tolerated, and could be weighted another way for non-real-time transactions (such as email or fax transactions) and so that a relatively large amount of agent wait time is tolerated.

In another exemplary embodiment, the agents may be queued on the basis of "availability," with the longest waiting available agent (i.e., the most idle agent) being at the head of the queue and the most unavailable agent (i.e., an unavailable agent who is predicted to be unavailable the longest time) being at the tail of the queue. The identifying and testing steps may then include searching through the queue to find agents with suitable skill proficiency attributes.

In both of the foregoing embodiments, the availability attribute assigned to each (unavailable) agent can be calculated using predictive methods, including methods that predict the availability of agents occupied in contact activity and those who are engaged in non-contact activity. The calculation of agent availability for occupied agents attempts to determine the time when an agent will complete a current transaction and whether that agent will then be able to handle a new transaction. The calculation result will depend upon the type of transaction being handled, the elapsed time of the transaction, the statistical handling time required for the transaction type, whether the agent is due for a break, agent load balancing considerations, and possibly other factors. The calculation of agent availability for agents engaged in non-contact activity attempts to determine the time when the agent will be ready to handle a new transaction. The calculation result will depend upon the expected return time of the agent, which can be determined using automated workforce management methods of the type used for establishing agent staff schedules and determining agent staff requirements. Consideration may also be given to agent adherence, which is a measure of an agent's historical (and/or real-time) adherence to assigned schedules. Agent adherence can be used to weight availability attributes or employed as a separate attribute.

The foregoing predictive determinations can be performed using background processing that periodically updates an agent attribute matrix or an agent availability queue. A separate processor may also be used for such calculations. Alternatively, event driven processing could be used to perform availability updates whenever an agent transitions between being available and unavailable, and visa versa.

The invention can be implemented within a telephone switching apparatus or on separate equipment, such as a data network server associated with a telephone switching apparatus. The telephone switching apparatus can be either customer premises equipment (e.g., a Private Branch Exchange) or a switch located at a telephone service provider Central Office.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE PREFERRED EMBODIMENT

Figure 1:
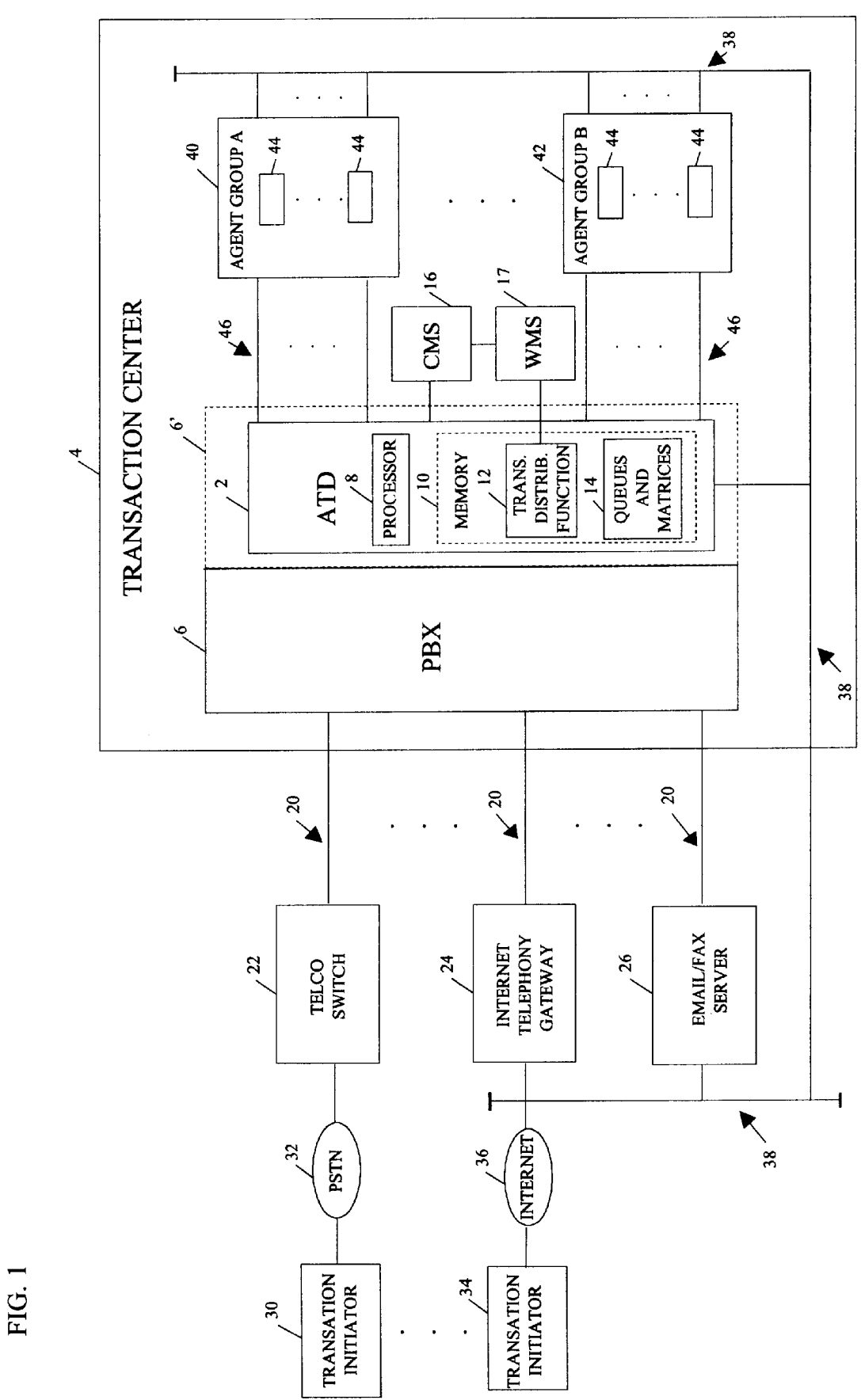
FIG. 1 is a block diagram showing relevant portions of an exemplary automated transaction distribution system constructed in accordance with the invention.

Turning now to the figures, wherein like reference numerals represent like elements in all of the several views, FIG. 1 illustrates an exemplary Automated Transaction Distribution (ATD) system 2 located, by way of example only, at a customer premises transaction center 4. The ATD system 2 can be deployed within a Private Branch Exchange (PBX) 6 (as shown by the dotted line 6' in FIG. 1) or as an adjunct thereto running on a separate platform, such as a data network server (not shown). Alternatively (also not shown), the ATD system 2 could be implemented at a Central Office (CO) maintained by a telephone service provider at a location that is remote from the transaction center 4. In a PBX environment, the ATD system 2 could be implemented using the DEFINITY® Enterprise Communications System (ECS) automated transaction distribution product from Lucent Technologies Inc. (Lucent), running Lucent's CentreVu® Advocate software. In a CO environment, the ATD system 2 could be implemented using Lucent's Pinnacle® automated transaction distribution system.

In either environment, the ATD system 2 is preferably a program-controlled data processing system that includes a data processor 8 operating in conjunction with a program memory 10. In addition to various operating system and control software, the memory 10 stores a transaction distribution function 12 and maintains a plurality of queue and matrix data structures 14 that are used for matching transactions to agents. As described in more detail below, the transaction distribution function 12 is the function that determines the assignment of a transaction initiator to an agent. Although not shown, the ATD system 2 also conventionally includes interfaces to external communication links, a communication switching fabric, and one or more service circuits providing functions such as tone and announcement generation. Also associated with the ATD system 2 is a Call Management System (CMS) 16 that conventionally functions to maintain transaction records and transaction center statistics for use in managing the ATD system and in generating ATD system operational reports. As described in more detail below, this information can be used by the transaction distribution function 12 to predict the availability of agents who are occupied working transaction contacts. A Work Force Management (WFM) system 17 may also be implemented to receive transaction center operational data from the CMS 16 and establish agent schedules. As described in more detail below, this information can be used by the transaction distribution function 12 to predict the availability of agents engaged in non-contact work and to determine whether occupied agents may be due for a break, a meeting, or other non-contact activity.

The transaction center 4 receives transaction communications over a plurality of communication pathways 20, which preferably comprises telephone lines and/or trunks. The pathways 20 may be connected to one or more switching or routing entities, including the usual telephone network switch 22, an Internet Telephony Gateway (ITG) 24, and an email/facsimile server 26, depending on the communication mode and pathway selected by transaction initiators. For example, a transaction initiator 30 may choose to communicate via the Public Switched Telephone Network (PSTN) 32 to the telephone network switch 22. Another transaction initiator 34 may choose to communicate using voice over the Internet 36 and a Local Area Network (LAN) 38 to the ITG 24. Alternatively, the transaction initiator 34 may choose to communicate via email or facsimile over the Internet 36 and the LAN 38 to an email/facsimile server 26.

Regardless of the communication mode or pathway used, the ATD system 2 processes transactions arriving on the communication pathways 20, or across the LAN 38, and assigns them to agents who are trained to handle certain categories of transactions based on the requirements thereof. To that end, it is conventional to group agents according to their skill sets such each group of agents (agent group) contains agents having similar skills, albeit potentially different levels of proficiency relative to each skill. FIG. 1 illustrates two such agent groups 40 and 42, respectively labeled as "Agent Group A" and "Agent Group B." Each agent actively handling transactions at the transaction center 4 (or who will be imminently handling transactions following a period of non-contact activity) is assigned to an agent terminal 44 that typically comprises a terminal capable of handling telephony and/or data communication. The agent terminals 44 connect to the ATD system 2 via voice/data pathways 46, and preferably also connect to the LAN 38.

Figure 2:
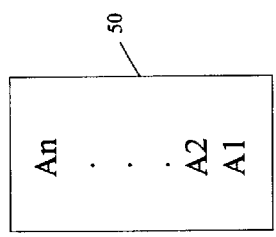
FIG. 2 is a block diagram showing data structures used to match transactions to transaction handling agents in accordance with a first embodiment of the invention.
Figure 2:
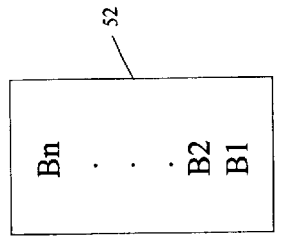

Incoming transactions arriving at the transaction center 4 are processed by the ATD system 2 and assigned to one of the transaction queues stored in the memory 12. FIG. 2 illustrates two such transaction queues 50 and 52, labeled as "Transaction Queue A" and "Transaction Queue B," respectively. As is known in the art, each transaction queue is assigned to handle transactions having particular requirements. By way of example, if the transaction center 2 is operated by a product manufacturing enterprise, Transaction Queue A might handle sales transactions and Transaction Queue B might handle customer service transactions. The transactions in these transaction queues can be ordered according to any known transaction queuing method, including longest wait time and other priority schemes. In FIG. 2, highest priority transactions are shown at the bottom portion of the queues, and lowest priority transactions are shown at the top portion of the queues. Thus, in the respective Transaction Queues A and B, transactions A1 and B1 are at the head of the queues, transactions A2 and B2 have the next highest priority, and transactions An and Bn are at the tail of the queues.

Each agent group is typically (albeit not necessarily) assigned to handle one of the transaction queues as a primary queue, and another one of the transaction queues as the secondary queue. In FIG. 2, Agent Group A (reference numeral 40) is the primary agent group for Transaction Queue A and the secondary agent group for Transaction Queue B. Agent Group B (reference numeral 42) is the primary agent group for Transaction Queue B and the secondary agent group for Transaction Queue A.

In a conventional automated transaction distribution system, transactions awaiting handling in a transaction queue are normally distributed to the primary agent group responsible for the queue. If there are no available agents in the primary agent group, an agent in the secondary agent group may be assigned to handle the transaction. As described in the Background section above, the pool of available agents in an agent group is conventionally limited to idle (available) agents. Agents who are unavailable because they are occupied or engaged in non-contact activities (e.g., wrapping-up after terminating a transaction, on a break, in a meeting, in training, etc.) are not considered even though they may become available in a short period of time. This can result in a less than optimally qualified agent in either the primary or secondary agent group being assigned to handle a transaction even though there is a better qualified agent who will soon become available.

The solution provided by the invention is to consider all agents for transaction assignment, including those who are unavailable at the time of assignment but who are expected to become available within an acceptable time period to handle the type of transaction awaiting assignment. By way of further summary, in response to a transaction reaching the head of one of the transaction queues, the ATD system 2, and particularly the transaction distribution function 12, identifies an agent having sufficient skills to handle the transaction commensurate with a desired skill proficiency level. The transaction distribution fiction 12 then tests whether the identified agent is either available, or unavailable but expected to become available within an acceptable time period (e.g., using information provided by the CMS 16 and the WFM system 17). If so, the transaction is assigned to the identified agent.

The transaction assignment procedure of the invention can be implemented in several ways. For example, in one embodiment of the invention, the agents in each agent group are listed in an agent matrix that is stored as a data structure in the memory 10. FIG. 2 illustrates two such agent matrices 60 and 62 that respectively correspond to Agent Group A and Agent Group B. Each agent entry in the matrices 60 and 62 preferably includes one or more skill proficiency attributes 70 and an availability attribute 72. When a transaction is ready to be assigned from a transaction queue, the matrices for the agent groups associated with the transaction queue are scanned and the skill proficiency and availability attributes associated with one or more of the agents are evaluated to determine the most suitable agent.

In the embodiment of FIG. 2, agent skill proficiency and availability attributes can be evaluated separately or together. If separate skill proficiency and availability attribute analysis is performed, the agent skill proficiency attributes can be evaluated first to identify an agent or agents having the highest skill proficiency levels. The availability attributes can then be tested against an availability threshold representing, for example, the longest time that a transaction initiator should have to wait for the agent to become available for a particular transaction type. If the agent with the highest skill proficiency level has an acceptable availability attribute, he or she will be assigned the transaction. If the agent's availability attribute is not acceptable, the agent will not receive the transaction and another agent with a suitably high skill proficiency level will be tested for availability.

If desired, the availability attributes can span a range that ranks both available and non-available agents on a single scale, and facilitates a most-idle agent assignment scheme. An available agent who has been idle the longest can be assigned the most favorable availability attribute (e.g., a value reflecting the length of time that the agent has been idle), whereas a non-available agent who is expected to remain unavailable the longest can be assigned the least favorable availability attribute (e.g., a value reflecting the predicted time until availability). Alternatively, availability rankings might only be used for non-available agents, with available agents having the same availability rating.

If combined skill proficiency and availability analysis is performed in the embodiment of FIG. 2, skill proficiency and availability attributes can be considered together to derive a composite attribute score that is used to select the best agent. For example, each agent's skill proficiency attributes (for skills required by the transaction) and the agent's availability attribute can be summed and the agent with the highest composite score can be assigned the transaction. Availability attributes that are greater than zero can be used to indicate available agents and availability attributes that are less than zero can be used to indicate non-available agents. A large positive availability attribute could represent an available agent who has been idle a long period of time, and a large negative availability attribute could represent a non-available agent who expected to remain occupied a long period of time.

FIG. 2 illustrates this exemplary scoring method. Assume that a transaction requires skills "1" and "N," Assume further that each agent has an assigned skill proficiency attribute for skills "1" and "N," and that each agent has an availability attribute. If an agent is available, the availability attribute will be a positive value that reflects the time the agent has been available to handle transactions. If the agent is unavailable and occupied, the availability attribute will be a negative value that reflects the number and type of transactions currently assigned to the agent (see discussion below for additional details regarding agents with multiple assigned transactions). If the agent is unavailable and unoccupied, the availability attribute will also be a negative value that the reflects the agent's estimated return time. In the matrix 60, the agent having the highest composite attribute score is Agent 2, with a composite attribute score of 25. The next highest scoring agent is Agent 1, with a composite attribute score of 15. The lowest scoring agent is Agent N, with a composite attribute score of 10. Note that in the matrix 60, all of the agents are available, i.e., none has a negative availability attribute. In the matrix 62, the agent having the highest composite attribute score is Agent 1, with a composite score of 15. The next highest scoring agent is Agent 2, with a composite score of 10. The lowest scoring agent is Agent N, with a composite attribute score of 5. Note that in the matrix 62, the highest ranking agent, Agent 1, is assigned the transaction even though he or she is occupied at the time of assignment. The longest waiting available agent, Agent N, is not assigned the transaction.

It should be noted that in some cases two or more agents may end up with the same score. For example, this would happen if Agent 2 in the matrix 62 had a skill proficiency score of 15 rather than 10. In that case, a "tie-breaker" decision would be made based on some factor of interest, such as an assessment of the importance of certain attributes relative to others.

For example, the availability attributes could be weighted relative to the skill proficiency attributes to reflect the relative importance of ensuring expeditious transaction processing and agent skill proficiency matching. The availability attributes might thus be weighted so that a relatively small amount of agent wait time is tolerated for real-time transactions, such as voice, video, chat, and multimedia transactions. Similarly, the availability attributes could be weighted so that a relatively large amount of agent wait time is tolerated for non-real-time transactions, such as fax and email transactions. Weighting can be implemented in a variety of ways, including multiplying the availability attributes by a weighting factor to emphasize (weighting factor>1) or de-emphasize (weighting factor<1) the availability attributes relative to the skill proficiency attributes. Weighting could also be used to emphasize other considerations, such as agent load balancing and other objectives.

Note that when a transaction is ready to be assigned from Transaction Queue A or Transaction Queue B in FIG. 2, both of the matrices 60 and 62 can be scanned and evaluated as a group to determine the most suitable agent across both matrices. Alternatively, the matrix corresponding to a transaction queue's primary agent group could be tested first, followed by testing of the secondary agent group matrix if no suitable primary group agent is found.

Figure 3:
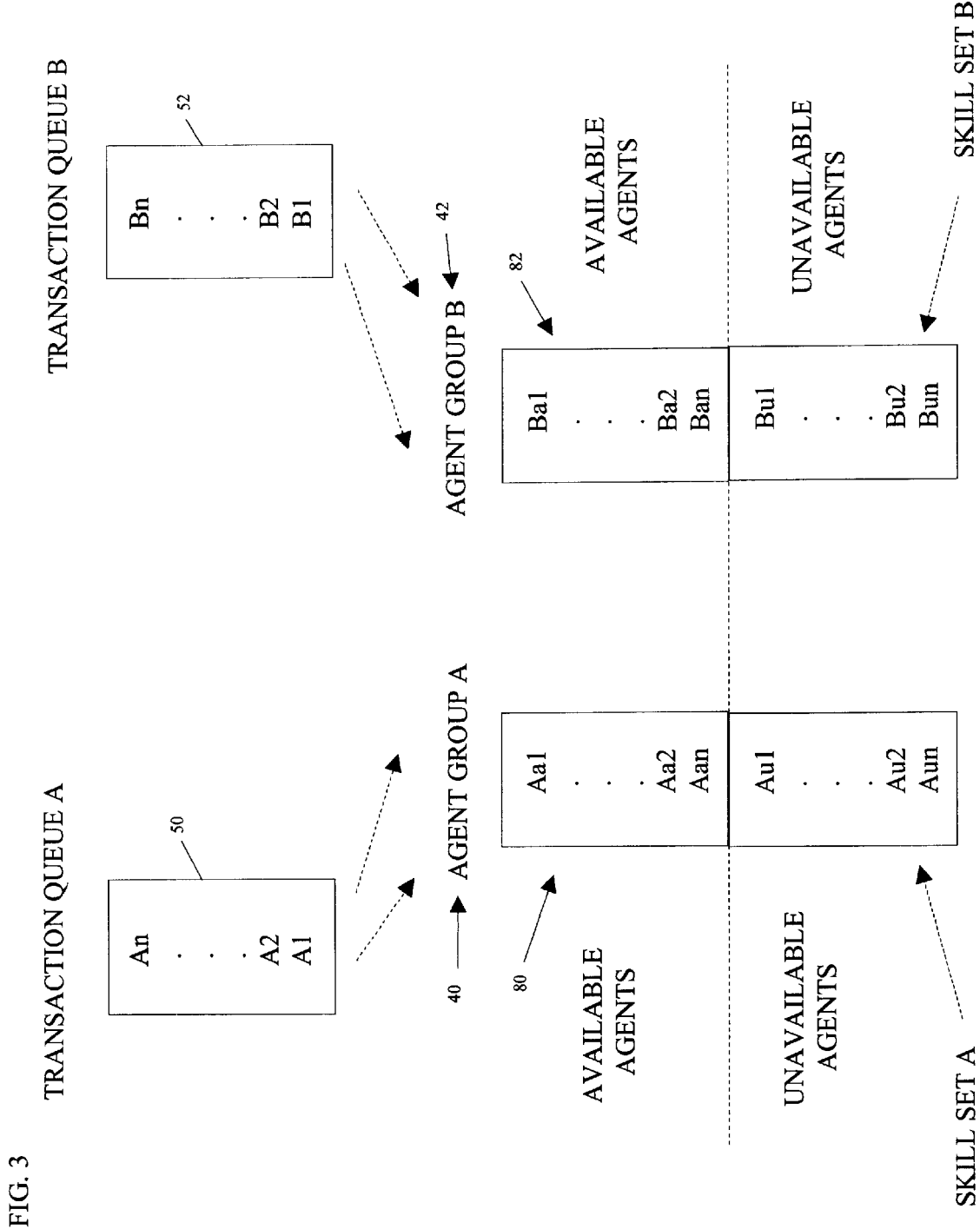
FIG. 3 is a block diagram showing data structures used to match transactions to transaction handling agents in accordance with a second embodiment of the invention.

FIG. 3 illustrates an alternative embodiment of the invention wherein agent queues are used to rank agents by availability. Specifically, agents in Agent Group A are queued in an agent queue 80 and agents in Agent Group B are queued in an agent queue 82. At the head of each queue 80 and 82 are available agents who have been idle the longest. Available agent Aa1 is at the head of the agent queue 80, while available agent Ba1 is at the head of the agent queue 82. At the tail of each queue 80 and 82 are unavailable agents who are expected to remain occupied the longest. Unavailable agent Aun is at the tail of the agent queue 80, while unavailable agent Bun is at the tail of the agent queue 82. This ordering will result in each queue 80 and 82 having an available agents portion and an unavailable agents portion, as shown in FIG. 2. Alternatively, queues 80 and 82 could each be divided into separate sub-queues respectively containing available and unavailable agents.

Although not shown, each agent entry in the agent queues 80 and 82 preferably includes a listing of one or more skill proficiency attributes associated with a particular agent. Because the agent ordering in the agent queues 80 and 82 reflects only relative availability, each agent entry may also include an availability attribute to quantify the agent's availability in absolute terms. When a transaction is ready to be assigned from Transaction Queue A or Transaction Queue B, the transaction distribution function 12 considers the agent queue for the primary agent group serving the transaction queue. Each agent in the agent queue is checked sequentially, beginning with the agent at the head of the queue, until a suitable skill proficiency match (for skills required by the transaction) and an availability match are found. Matching can be based on a check of the agent skill proficiency attribute(s) followed by a check of the agent availability attribute, or by scoring the skill proficiency and availability attributes together. In either case, the individual or combined attribute values can be compared against thresholds to determine whether the agent will be assigned the transaction.

In some cases, it may be necessary to scan an agent queue as in FIG. 3 (or a matrix as in FIG. 2) more than once. This could occur if no agent is found having the desired skill proficiency level(s) in a first pass through the agent queue or matrix. A second pass could then be performed through the same agent queue or matrix using a more relaxed skill proficiency threshold. Alternatively, a first pass through the agent queue or matrix may reveal multiple agents having the requisite skill proficiency level but having non-qualifying availability attributes. At that point, additional passes could be made through the same queue or matrix until an agent with a qualifying availability attribute is found. Alternatively, the agent queue or matrix for the secondary agent group could be checked.

Note that a combination of the matrices and queues of FIGS. 2 and 3 could be used for transaction distribution. For example, available agents could be ranked in an agent queue in accordance with FIG. 3 that would be checked first when a transaction is ready to be assigned. Unavailable agents could then be listed in a matrix in accordance with FIG. 2 that would be checked if no qualifying agent is found in the agent queue containing available agents.

In each of the embodiments of FIGS. 2 and 3, the availability attributes for agents can be derived on the fly from a stored timestamp value specifying the time that each agent first became (or will become) available. In the matrices 60 and 62 of FIG. 2, for example, a timestamp value could be stored for each agent in the "Available" column instead of the positive and negative values shown. When transaction distribution processing is performed relative to a transaction to be assigned, the timestamp value can be subtracted from the current time to yield some number that reflects agent availability. If the agent is available (i.e., the timestamp value is earlier than the current time) the subtraction operation will produce a positive result. If the agent is unavailable (i.e. the timestamp value is later than the current time), the subtraction operation will produce a negative result. In the agent queues 80 and 82 of FIG. 3, agent ordering can be based directly on the timestamp values, and the timestamp values could also be stored as the availability attributes (not shown) associated with each agent.

The predicted availability time for unavailable occupied agents will turn on the number and type of transactions assigned to the agent for handling, the time that the agent has been occupied with the current transaction, the statistical time required to handle such transactions, whether the agent is due for a break, agent load balancing considerations, and possibly other factors. The availability attributes for agents engaged in non-contact activity such as breaks, meetings or the like, can be calculated by determining a predicted return time for each such agent. The WFM system 17 is ideally suited for this purpose insofar as it performs scheduling for all agents. The WFM system 17 can also be used to determine if an occupied agent is due for a break. The WFM system 17 may be implemented as an off-the-shelf workforce management software tool. Such products are able to receive transaction center data from the CMS 16 (in some cases using real-time data feeds) and are used, among other things, to establish schedules for transaction center agents. Existing WFM products are available that can schedule agent activity with relatively fine granularity (e.g. in quarter hour increments). These products may be adapted such that the information they provide is fed to the transaction distribution function 12 for use in the calculation of agent availability times.

In determining the availability of agents engaged in non-contact activity, consideration may also be given to agent adherence, which is a measure of an agent's historical (and/or real-time) adherence to assigned schedules. Agent adherence data can be used to weight availability attributes or can be used as a separate attribute. For example, if the agent is routinely late in returning from breaks, this should be considered in predicting the likely return time of the agent, such that more punctual agents are preferred.

Calculation of agent availability attributes can be performed on a periodic basis using background processing performed by the transaction distribution function 12. As new availability attributes are calculated, the matrices 60 and 62, and/or the queues 80 and 82, can be dynamically updated to reflect the most current availability information. Separate processing (e.g. where the transaction distribution function 12 is distributed across multiple processors) could be used to perform such calculations. In addition, it may be desirable to periodically assess previously assigned transactions that are still awaiting handling insofar as transaction reassignments may be warranted as agent availability attributes change (see discussion below).

An alternative approach is to calculate agent availability in event driven fashion. For example, when an agent becomes available because the agent has completed a transaction, logged-in after a break, or otherwise, the transaction distribution function 12 can set the agent's availability attribute with the timestamp value previously described. Similarly, when an agent becomes unavailable because the agent has been assigned a transaction, logged-out for a break, or otherwise, the transaction distribution function 12 can calculate the anticipated availability time, as described above, and set the agent's availability attribute to this value.

As briefly mentioned above, certain processing situations may require a recalculation of agent availability and a redistribution of previously assigned transactions. For example, if an unavailable agent either completes a transaction in advance of the predicted availability time, or holds over on a transaction beyond the predicted availability time, the agent's availability attribute should be recalculated. In the early completion situation, transaction distribution processing should be re-performed to provide an opportunity for off-loading transactions from more busy agents. In the holdover situation, transaction distribution processing should be re-performed to provide an opportunity for off-loading transactions to less busy agents. Subsequently, if the holdover agent becomes available, and if one or more of the off-loaded transactions have not yet been taken up for handling by new agents, they can be requeued to the original agent. Another candidate situation for agent availability recalculation and transaction redistribution is where an assigned transaction awaiting handling by an agent is terminated by the transaction initiator.

Another interesting processing situation arises when multiple transactions are assigned to an agent in a prioritized fashion, and a later transaction assigned to an unavailable agent has a higher priority (based on service objective, transaction wait time or some other priority scheme) than an earlier transaction assigned to the same agent. In that case, the assignment of the later transaction could be made to the agent based on the ability of that transaction to "bump" the earlier transaction to a lower priority position. If this occurs, a reassignment of the earlier, lower priority transaction may also have to be made.

To handle this scenario, it is suggested that an agent's availability attribute relative to one transaction assigned to the agent can be different from the agent's availability attribute relative to another transaction assigned to the agent. For example, a set of transactions assigned to an unavailable agent can have increasing availability attributes that reflect the order in which the transactions will be handled by the agent. To accommodate these differing availability attributes, it is preferable to associate an agent availability attribute with each transaction, e.g., as a transaction attribute, upon transaction assignment. To illustrate further, as each new transaction is assigned to an agent, the agent's availability attribute in the agent matrix or queue can be updated, and additionally, the updated value can be stored as an attribute of the newly assigned transaction in the transaction queue. Each of the assigned transactions would now have its own agent availability attribute for ranking purposes. As new transactions are tested for possible assignment to the same agent, the transaction distribution function 12 would consult the availability attribute in the agent matrix or queue, and would also check the availability attributes of lower ranking transactions assigned to the agent insofar as the transaction currently being evaluated may have priority over one or more of the previously assigned transactions. If the new transaction is assigned to the agent, its agent availability attribute is calculated. In addition, all of the agent availability attributes associated with previously assigned transactions should be recalculated to reflect the new priority scheme. A transaction redistribution analysis should also be performed to determine whether bumped transactions could be better served by other agents.

Figure 4:
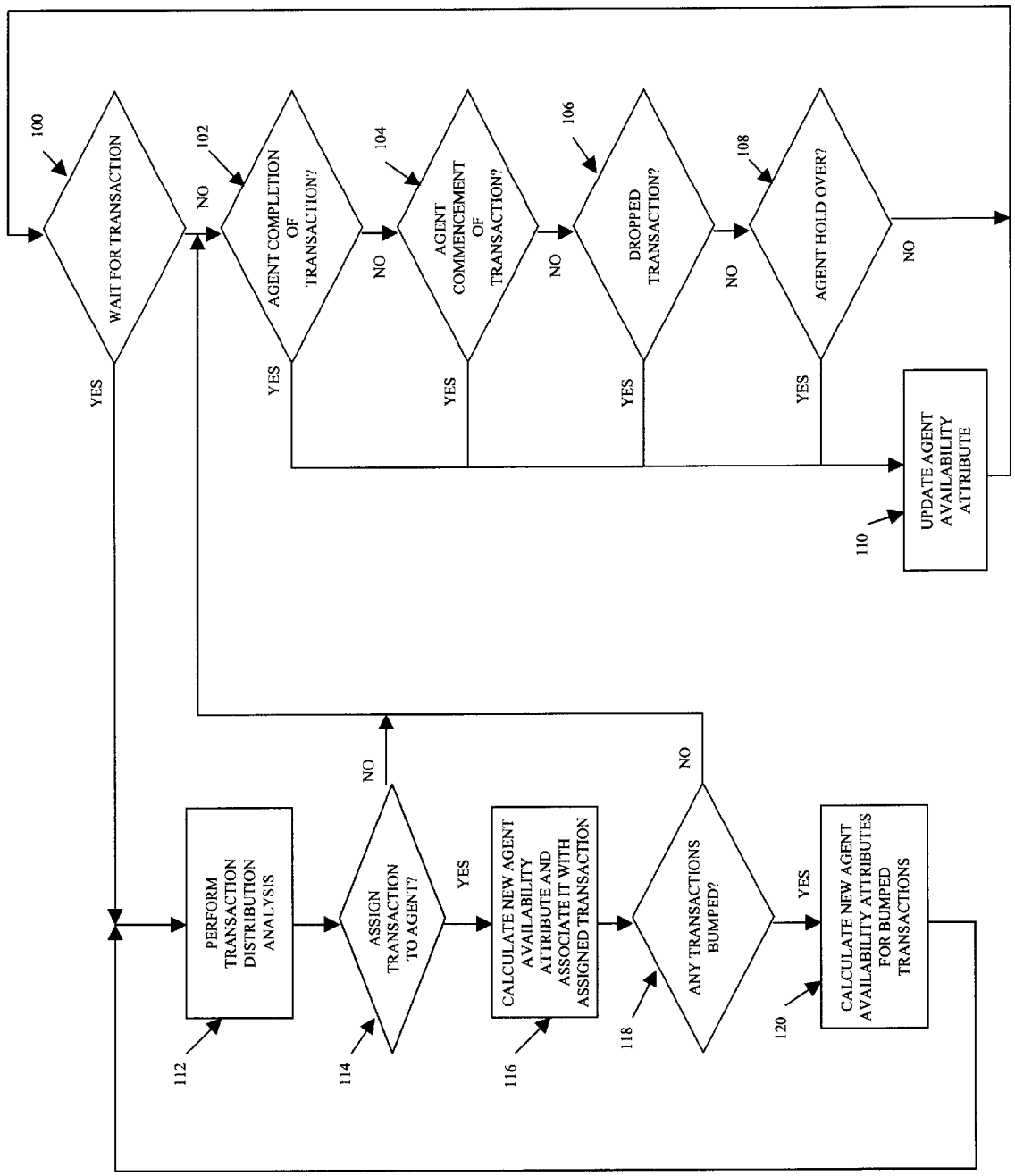
FIG. 4 is a flow diagram showing exemplary processing steps performed in accordance with the invention.

Turning now to FIG. 4, an example of an event driven processing environment with transaction prioritization is illustrated. In step 100, the transaction distribution function 12 tests for a new transaction. If none is pending, a series of event tests is performed in steps 102, 104, 106 and 108. In these processing steps, the transaction distribution function respectively tests for the following agent events: 1) completion of agent processing of a transaction; 2) commencement of agent processing of a transaction; 3) transaction drop prior to agent handling; and 4) agent holdover on a transaction. If any of these conditions is detected, the availability attribute for the affected agent is updated in step 110 (i.e., a timestamp value is stored). Following timestamp calculation, or if none of the aforementioned conditions is present, processing returns to step 110 to await a transaction.

When a new transaction is detected in step 100, a transaction distribution analysis is performed (as described above) in step 112. Assuming a suitable agent is found, the transaction is assigned to that agent in step 114. If no suitable agent is found, processing returns (following appropriate disposition of the unassigned transaction) to step 102 to resume agent event testing. If an agent assignment is made in step 114, the agent's availability attribute is updated (e.g., a new timestamp value is stored) in step 116. This attribute is also associated with the assigned transaction. In step 118, a test is made to determine whether the transaction assignment in step 114 caused any other transactions assigned to the same agent to be bumped. If not, processing returns to step 102 to resume agent event testing. If one or more transactions were bumped, new agent availability attributes are calculated and associated with the bumped transactions in step 120. Processing then returns to step 112 to re-evaluate whether the bumped transactions should be reassigned. This processing loop continues until there are no further bumped transactions requiring reassignment assessment.

Accordingly, an automated transaction distribution system and method have been described wherein transaction assignments can be made to unavailable agents. While various embodiments have been disclosed, it should be apparent that many variations and alternative embodiments could be implemented in accordance with the invention. For example, it may be desirable to remove an agent from, or add an agent to, an agent queue/matrix based on customer-specified criteria. Consider a logged-in agent who is scheduled for a period of extended non-contact activity, such as a meeting, a day-off, or the like. If that agent does not have time to handle a new transaction prior to logging off, he/she should probably be removed from all agent queues/matrices to avoid further transaction assignments. A threshold availability value could be used by the transaction distribution function 12 to determine when an agent's scheduled period of non-contact activity is large enough to warrant removing the agent from an agent queue/matrix. In the converse situation, a non-logged-in agent who is scheduled to return from a period of non-contact period within some threshold period of time could be added to an agent queue/matrix to allow transactions to be assigned to that agent. It is understood, therefore, that the invention is not to be in any way limited except in accordance with the spirit of the appended claims and their equivalents.

What is claimed is:

1. An automated transaction distribution method, comprising the steps of:
   in response to a transaction requiring handling by an agent, identifying, in a group of agents that includes both unavailable agents engaged in contact activities and unavailable agents engaged in non-contact activities, an agent having sufficient transaction skills for handling said transaction commensurate with a desired skill proficiency level;
   testing (either in conjunction with said identifying step or separately therefrom), whether said identified agent is available, or unavailable but expected to become available within an acceptable time period; and if so
   assigning said transaction to said identified agent even if said identified agent is unavailable due to being engaged in said non-contact activities.

2. An automated transaction distribution method in accordance with claim 1 wherein said testing step includes considering an availability attribute associated with said agents.

3. An automated transaction distribution method in accordance with claim 1 wherein said identifying and testing steps respectively include searching for said identified agent in a queue that ranks said agents according to their availability and stores one or more skill proficiency attributes and an availability attribute in association with each agent in said queue, with the agent at the head of said queue being the first agent selected for possible transaction assignment and the agent at the tail of said queue being the last agent selected for possible transaction assignment, said searching being performed as necessary for each agent in said queue until said identified agent is found.

4. An automated transaction distribution method in accordance with claim 1 wherein said identifying and testing steps respectively include scanning a matrix that lists said agents and stores one or more skill proficiency attributes and an availability attribute in association with each listed agent, said scanning being performed relative to each said listed agent as necessary until said identified agent is found.

5. An automated transaction distribution method in accordance with claim 4 wherein said availability attributes are weighted relative to said one or more skill proficiency attributes to reflect the relative importance of ensuring expeditious transaction processing and agent skill proficiency matching.

6. An automated transaction distribution method in accordance with claim 5 wherein said availability attributes for unavailable agents are weighted so that a relatively small amount of agent wait time for unavailable agents is tolerated for real-time transactions and so that a relatively large amount of agent wait time for unavailable agents is tolerated for non-real-time transactions.

7. An automated transaction distribution method in accordance with claim 6 wherein said real-time transactions include voice or multimedia transactions and said non-real-time transactions include email or scanned document transactions.

8. An automated transaction distribution method in accordance with claim 1 wherein said testing step includes testing when said selected agent is unavailable due to handling another transaction (occupied agent).

9. An automated transaction distribution method in accordance with claim 8 wherein said testing step includes determining for an occupied identified agent a predicted availability time that said identified agent will be available based on a transaction type that said agent is currently handling, the elapsed time that the agent has been occupied, and the statistical handling time required for the transaction type.

10. An automated transaction distribution method in accordance with claim 1 wherein said testing step includes determining a predicted availability time for said identified agent when said identified agent is unavailable due to being engaged in non-contact activity, said predicted availability time being determined in part by consideration of agent adherence data.

11. An automated transaction distribution system, comprising:
   means responsive to a transaction requiring handling by an agent for identifying, in a group of agents that includes both unavailable agents engaged in contact activities and unavailable agents engaged in non-contact activities, an agent having sufficient transaction skills for handling said transaction commensurate with a desired skill proficiency level;
   means for testing (either in conjunction with said identifying means or separately therefrom) whether said identified agent is available, or unavailable but expected to become available within an acceptable time period; and
   means responsive to said testing means producing a positive result, for assigning said transaction to said identified agent even if said identified agent is unavailable due to being engaged in said non-contact activities.

12. An automated transaction distribution system in accordance with claim 11 wherein said testing means includes means for testing an availability attribute associated with said agents.

13. An automated transaction distribution system in accordance with claim 11 wherein said identifying and testing means respectively include search means for searching for said identified agent in a queue that ranks said agents according to their availability and stores one or more skill proficiency attributes and an availability attribute in association with each agent in said queue, with the agent at the head of said queue being the first agent selected for possible transaction assignment and the agent at the tail of said queue being the last agent selected for possible transaction assignment, and evaluation means for evaluating skill proficiency and availability attributes associated with said agents in said queue as necessary until said identified agent is found.

14. An automated transaction distribution system in accordance with claim 11 wherein said identifying and testing means respectively include scanning means for scanning a matrix that identifies said agents and stores one or more skill proficiency attributes and an availability attribute in association with each listed agent, and evaluating means for evaluating said skill proficiency and availability attributes associated with said agents as necessary until said identified agent is found.

15. An automated transaction distribution system in accordance with claim 14 wherein said availability attributes are weighted relative to said one or more skill proficiency attributes to reflect the relative importance of ensuring expeditious transaction processing and agent skill proficiency matching.

16. An automated transaction distribution system in accordance with claim 15 wherein said availability attributes for unavailable agents are weighted so that a relatively small amount of agent wait time is tolerated for real-time transactions and so that a relatively large amount of agent wait time is tolerated for non-real-time transactions.

17. An automated transaction distribution system in accordance with claim 16 wherein said real-time transactions include voice or multimedia transactions and said non-real-time transactions include email or scanned document transactions.

18. An automated transaction distribution system in accordance with claim 11 wherein said testing means includes means for testing when said selected agent is unavailable due to handling another transaction (occupied agent).

19. An automated transaction distribution system in accordance with claim 11 wherein said testing means includes means for determining for an occupied identified agent a predicted availability time that said identified agent will be available based on a transaction type that said agent is currently handling.

20. An automated transaction distribution system in accordance with claim 11 wherein said testing means includes means for determining a predicted availability time for said identified agent when said identified agent is unavailable due to being engaged in non-contact activity, said predicted availability time being determined in part by consideration of agent adherence data.

21. In an automated transaction distribution system, a method for transaction distribution, comprising the steps of:
searching across a group of agents each of whom has particular transaction skills and skill proficiency levels and each of whom may be either available or unavailable due to being engaged in contact activity or unavailable due to being engaged in non-contact activity at any given time; and
assigning transactions to said agents on the basis of their skills and, if they are unavailable, their predicted availability time, including assigning transactions to ones of said agents who are presently unavailable due to being engaged in non-contact activities but are predicted to become available within an acceptable time period.

22. The method of claim 21 wherein transactions may be assigned to agents who are unavailable due to being engaged in other transactions, and wherein said predicted availability time is the time predicted for said agents to complete said other transactions and become available to receive new transactions.

23. The method of claim 21 wherein said predicted availability time is the time predicted for said agents to return from said non-contact activities and become available to receive new transactions.

24. The method of claim 23 wherein said predicted availability time includes consideration of agent adherence data.

25. The method of claim 21 wherein said assigning step includes assigning multiple transactions to one unavailable agent based on predicted agent availability times associated with each transaction according to a transaction ranking scheme.

26. The method of claim 25 wherein said assigning step includes considering relative to a candidate transaction the availability attribute of said unavailable agent and the unavailability times associated with transactions previously assigned to said unavailable agent that are of lower priority than said candidate transaction.

27. The method of claim 25 wherein following said assigning step carried out on behalf of said candidate transaction, the unavailability times associated with said lower priority transactions are re-determined and said assigning step is performed on behalf of said lower priority transactions to assess whether reassignment to another agent is warranted.

28. The method of claim 21 further including the step of re-assigning transactions to new agents if, following said transaction assignment step, original agents to whom said transactions were originally assigned do not become available, said transactions being re-assigned to said original agents if said original agents become available prior to said transactions being handled by said new agents.

29. The method of claim 28 wherein said re-assigning step further includes reassigning transactions from other agents if, following said transaction step, original agents to whom said transactions were originally assigned complete said transactions ahead of schedule or if said transactions are dropped.

30. The method of claim 29 wherein said re-assigning step further includes re-calculating the predicted availability time for agents who are relieved of transactions or who gain transactions.

31. An automated transaction distribution method comprising the steps of:
determining when an unavailable resource that is presently engaged in non-contact activity is expected to become available; and
in response to a transaction requiring handling by a resource, assigning said transaction for handling to one of a plurality of resources that is unavailable due to being presently engaged in non-contact activity but expected to become available within an acceptable period.

32. The method of claim 31 wherein said plurality of resources includes available resources and resources unavailable due to being presently engaged in contact activities and resources unavailable due to being presently engaged in non-contact activities.

33. An automated transaction distribution system comprising:

a predictor of when an unavailable resource that is presently engaged in non-contact activity is expected to become available; and a transaction distributor, cooperative with said predictor, that responds to a transaction requiring handling by a resource by assigning said transaction for handling to one of a plurality of resources that is unavailable due to being presently engaged in non-contact activity but is expected to become available within an acceptable time.

* * * * *